United States Patent Office 2,727,793
Patented Dec. 20, 1955

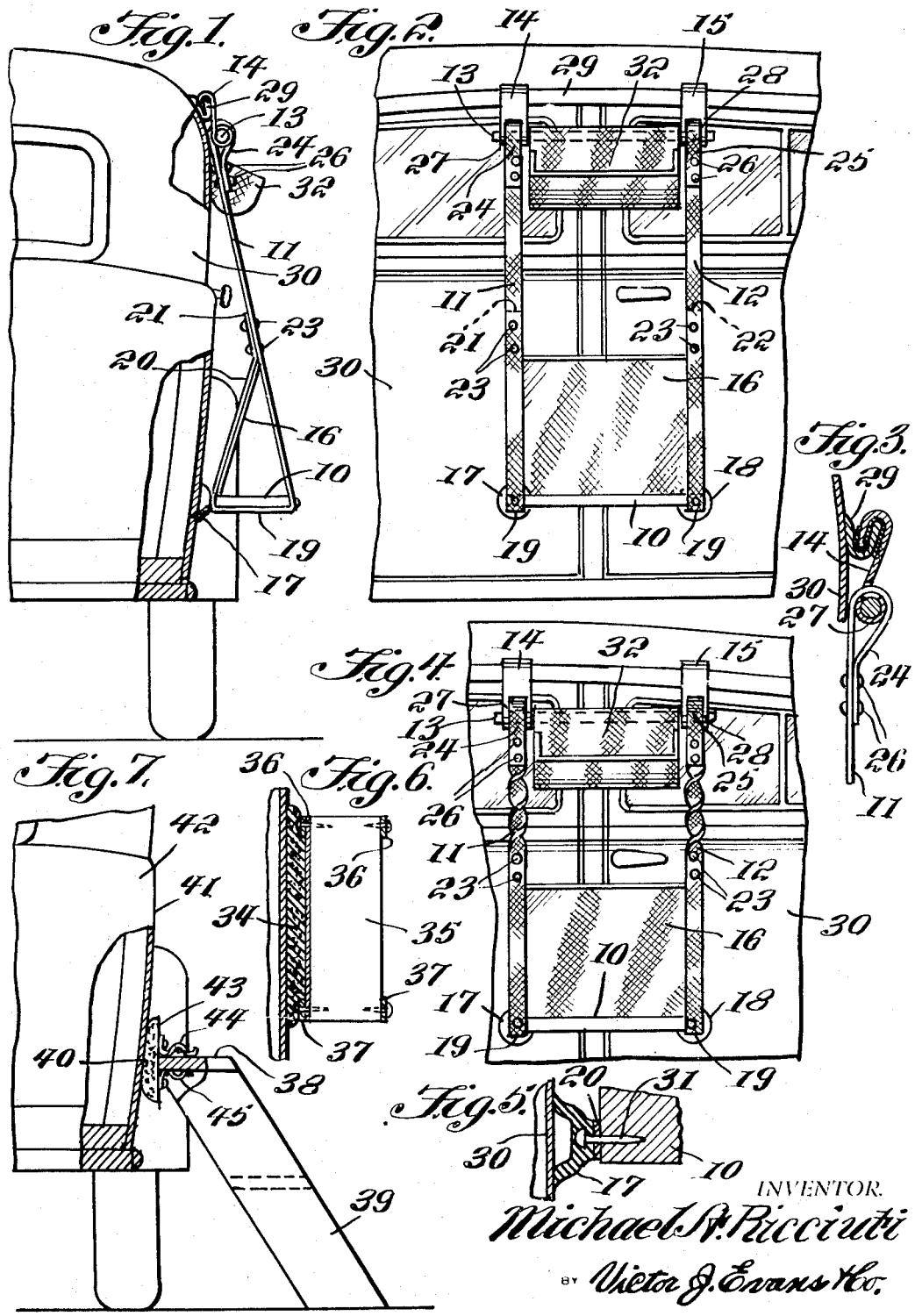

2,727,793

PORTABLE MOTOR VEHICLE STEP

Michael A. Ricciuti, Madison, Conn.

Application April 22, 1952, Serial No. 283,694

1 Claim. (Cl. 304—15)

This invention relates to devices used in combination with motor vehicles, and in particular a step adapted to be removably attached to the side of a vehicle to facilitate reaching the upper surface of the top for cleaning.

The purpose of the invention is to provide an attachment that is hooked to the gutter along the upper edge of the side of a motor vehicle whereby a step provided in the lower part of the attachment and connected to hooks on the upper end by straps is supported against the side of the vehicle to provide a temporary step.

With the conventional type of motor vehicle body it is difficult to reach across the top to clean the upper surface particularly in washing and waxing and a step ladder or other device positioned against the side of the vehicle scratches the finish. With this thought in mind this invention contemplates a step suspended by flexible straps from the gutter at the upper edge of the side of the vehicle and spaced from the side of the vehicle with vacuum cups whereby the step is readily positioned for use and at the same time readily removed after use.

The object of this invention is, therefore, to provide means for forming a temporary step whereby the step may be supported from the gutter at the upper edge of the motor vehicle body and positioned against the side of the body to facilitate reaching the top.

Another object of the invention is to provide a step adapted to be temporarly attached to the side of a motor vehicle body without marring the finish thereof which is adapted to be used on substantially all vehicles now in use.

Another object of the invention is to provide means for mounting a step or a stand against the surface of a motor vehicle body without scratching the finish thereof whereby a stand or short step ladder may be positioned against the side of a motor vehicle body to provide means for reaching across the upper surface of the top of the vehicle.

A further object of the invention is to provide means for temporarily supporting a step from a motor vehicle body to facilitate cleaning the upper surface of the body in which the device is of a simple and economical construction.

With these and other objects and advantages in view the invention embodies a step having straps extended upwardly from the ends thereof with hooks on the upper ends of the straps adapted to be positioned over the gutter of the side of a motor vehicle body and with the step having cushioning means on the inner edge, and a stand also having cushioning means on the inner edge adapted to be supported from the ground upon which the vehicle is positioned and adapted to provide a step to facilitate cleaning the upper surface of the top of the vehicle without scratching the sides of the vehicle.

Other features and advantages of the invention will appear from the following description taken in connection with the drawing, wherein:

Figure 1 is an elevational view looking toward the rear of one side of a motor vehicle illustrating a step suspended from a gutter on the upper edge of the side of the vehicle and with parts broken away and shown in section.

Figure 2 is a side elevational view showing the device positioned against the side of a motor vehicle body with the ends of the body broken away.

Figure 3 is a detail illustrating one of the hooks for attaching the upper end of the attachment to the gutter of the motor vehicle body.

Figure 4 is a side elevational view similar to that shown in Fig. 2 showing the straps twisted to provide means for shortening the straps.

Figure 5 is a detail on an enlarged scale illustrating a method of attaching one of the vacuum cups to the step of the device and wherein the parts are shown in section.

Figure 6 is a sectional plan through the lower part of the device illustrating a modification wherein the inner edge of the step is provided with a continuous cushion.

Figure 7 is a view, similar to that shown in Fig. 1, illustrating a modification wherein the step is supported by legs from a surface upon which the vehicle is positioned, parts of the device being broken away and shown in section.

Referring now to the drawing wherein like reference characters denote corresponding parts the portable step of this invention includes a panel or step 10, straps 11 and 12 extended upwardly from the ends of the step, a dowel 13 extended through the upper end of the straps, hooks 14 and 15 positioned at the upper ends of the straps and mounted on the dowel, a kickpad 16 extended between the lower ends of the straps and vacuum cups 17 and 18 positioned on the inner edge of the step.

With the parts as illustrated in Figs. 1, 2, 3, and 4 the straps 11 and 12 extend across the lower surface of the step 10 with sections 19 secured to the under surface of the step and with sections 20 extended from the inner edge of the step upwardly to points 21 and 22 on the straps where the ends of the straps are secured to intermediate parts thereof with rivets and other fasteners, as indicated by the numeral 23.

The upper ends of the straps extend over the ends of the dowel 13 providing loops 24 and 25 and the ends of the straps from the loops are secured to the intermediate parts of the straps with rivets or other fasteners 26.

The clips or hooks 14 and 15 are provided with bifurcated lower ends 27 and 28 that straddle the loops at the ends of the straps and that are positioned around the end of the dowel 13. With the clips mounted on the ends of the straps in this manner the upper, hook-shaped ends thereof may be positioned in the gutter 29 on the surface of the motor vehicle body 30 whereby the step is readily suspended from the gutter and with the vacuum cups 17 and 18, which are secured to the inner edge of the step 10 with fasteners 31, positioned against the surface of the body.

A canvas pocket 32 may be provided on the dowel 13 and a washer or web 33 may be positioned against the vacuum cups and step 10, as shown in Fig. 5.

The inner edge of the step may also be provided with a continuous cushion 34 as shown in Fig. 6, in which the step is indicated by the numeral 35 and the supporting straps by the numerals 36 and 37.

A further modification is illustrated in Fig. 7 wherein a step 38, supported by legs 39 and provided with bumpers or a continuous resilient pad 40 is positioned against the side surface 41 of a motor vehicle 42. In this design the inner edge of the step 38 is provided with a kick plate 43 and the plate and bumper or resilient pad are secured to the step 38 with spring clips 44 and 45, or by other suitable means.

It will be understood, therefore, that the step may be supported from the gutter at the upper edge of the vehicle or from the ground, as may be desired.

With the parts arranged in this manner a step may be positioned against the side of a motor vehicle body to facilitate reaching the upper surface of the top of the body and when the device is not in use it may readily be placed in a pocket or in the trunk of the body as may be desired.

When it is desired to adjust the length of the straps the straps may be twisted as illustrated in Fig. 4, the loops at the upper ends being removed from the ends of the dowel 13, to facilitate twisting.

It will be understood that other modifications may be made in the design and arrangement of the parts without departing from the spirit of the invention.

What is claimed is:

A temporary step for use on side surfaces of motor vehicle bodies, comprising a substantially rectangular shaped panel, a pair of spaced parallel flexible straps positioned around the ends of said panel and including straight sections extending upwardly therefrom, horizontal portions of said straps being secured to the bottom of said panel, inclined sections of said straps extending upwardly from the horizontal portions and secured to the straight sections, said straps having loops on the upper ends thereof, a horizontally disposed dowel extended through the loops of the straps, a plurality of hooks mounted on said dowel and extending upwardly therefrom for engagement with the vehicle gutter, said hooks having bifurcated lower ends that straddle the loops at the upper end of the straps when said loops and said hooks are in position on said dowel, vacuum cups positioned on the inner edge of the panel, a flexible kick plate positioned between the inclined sections of the straps and extended from the inner edge of the panel and secured to said inclined sections.

References Cited in the file of this patent

UNITED STATES PATENTS

| | | |
|---|---|---|
| 265,263 | Howe | Oct. 3, 1882 |
| 632,226 | Menges | Aug. 29, 1899 |
| 803,398 | Cody | Oct. 31, 1905 |
| 896,295 | Haines | Aug. 18, 1905 |
| 957,324 | Gall | May 10, 1910 |
| 2,024,468 | McGinley | Dec. 17, 1935 |
| 2,051,241 | Biggers | Aug. 18, 1936 |
| 2,346,338 | Sway | Apr. 11, 1944 |
| 2,488,263 | Bishman | Nov. 15, 1949 |
| 2,508,527 | Martin et al. | May 23, 1950 |